Patented Jan. 27, 1925.

1,524,315

UNITED STATES PATENT OFFICE.

JOHN A. SCHAEFFER, OF ST. LOUIS, AND JOHN H. CALBECK AND BERNARD S. WHITE, OF JOPLIN, MISSOURI, ASSIGNORS TO THE EAGLE-PICHER LEAD COMPANY, OF CINCINNATI, OHIO, A CORPORATION OF OHIO.

BASIC-LEAD-SULPHATE PIGMENT.

No Drawing.   Application filed August 2, 1923.   Serial No. 655,242.

*To all whom it may concern:*

Be it known that we, JOHN A. SCHAEFFER, citizen of the United States of America, and resident of St. Louis, county of St. Louis, State of Missouri, and JOHN H. CALBECK and BERNARD S. WHITE, citizens of the United States of America, and residents of Joplin, county of Jasper, State of Missouri, have invented certain new and useful Improvements in Basic-Lead-Sulphate Pigments, of which the following is a true and exact description, reference being had to the accompanying drawings, which form a part thereof.

Our invention relates to a pigment which, like previously known pigments, is composed of basic lead sulphate but which is distinguished from such known pigments chiefly in that it has such greater brightness, whiteness and covering capacity as to adapt it for uses for which the previously known basic lead sulphates were unfitted.

Our new pigment has been developed in the practice of our new method of making basic lead sulphate described in our pending application for Letters Patent filed March 20, 1923, Serial Number 626,278, and in which we spray atomized lead into a highly heated furnace chamber having an atmosphere containing free oxygen and sulphur dioxide in such quantity as to react freely with the atomized lead. By properly regulating the proportions of oxygen, sulphur dioxide and atomized lead we can and do regulate the proportions of lead oxide and lead sulphate making up the basic lead sulphate produced and we are enabled to produce a pigment containing preferably a high percentage of lead oxide fully combined with lead sulphate and without appreciable uncombined lead oxide and free from admixture with substances which tend to decrease the covering power of the pigment and its brightness and whiteness.

While the characteristics which distinguish our new pigment from previously known basic lead sulphate pigments are distinctly present through a wide range of lead oxide percentages we have not found it advisable to produce a fumed basic lead sulphate having a lead oxide percentage lower than twenty per cent and by preference our pigment is made to consist of approximately thirty per cent of lead oxide and seventy per cent of lead sulphate. With even a lower combined lead oxide proportion than twenty per cent a pigment made by our process free from uncombined lead oxide and discoloring impurities, is clearly distinguishable from previously known pigments and is intended to be covered by our broader claims.

In the use of our method of manufacture we can and do use metallic lead free or nearly free from zinc and in consequence our product is substantially free from zinc oxide admixture and we believe that the absence of zinc oxide materially contributed to the distinctive good qualities of our pigment, particularly to its lower oil absorption.

Again, by using a fuel for our furnace which is free from ash or other materials which mix with the pigment, and in practice we prefer to use natural gas, our pigment is practically completely soluble in ammonium acetate and we believe that the absence of insoluble material largely contributes to the distinctive, good quality of our pigment.

Again, low oil absorption is a distinctive quality of our new pigment which in all compositions will show a clearly lower oil absorption than the previously known basic lead sulphates.

The covering or hiding power of our brighter and whiter pigment is quite as great as that of the previously made basic white lead pigments and when for purposes of comparison our pigment is by addition of lamp black brought to the same brightness and whiteness as the old product we have found that it has, when made with our preferred proportions of combined lead oxide, sixteen per cent more hiding power and we have also found that with much lower percentages of combined lead oxide the greater hiding power of our new pigment is still clearly manifest. The distinctive increase in brightness and whiteness of our pigment is we believe largely due to the absence of uncombined lead oxide and of zinc oxide as we have found that it is maintained with very considerable variations of combined lead oxide. We also believe that these distinctive qualities of our pigment are in no small degree due to the temperature control which our new process makes possible and to the complete combustion of carbon.

In comparing the brightness and whiteness of our new pigment with basic lead sulphate as previously made and with other pigments we have used Dr. A. H. Pfund's colorimeter and for determining the covering or hiding power of our pigment we have used Dr. Pfund's cryptometer.

It will be recognized by those skilled in the trade that the qualities of our new pigment are such as, from the paint makers' and painters' point of view, remove it from the class to which basic lead sulphate paints, as previously known, belong.

Having now described our invention, what we claim as new and desire to secure by Letters Patent, is:

1. As a new article of manufacture a fumed basic lead sulphate pigment of a high degree of whiteness, brightness and covering power substantially free from uncombined lead oxide.

2. As a new article of manufacture a fumed basic lead sulphate pigment of a high degree of whiteness, brightness and covering power substantially free from uncombined lead oxide and from zinc oxide.

3. As a new article of manufacture, a fumed basic lead sulphate pigment of a high degree of whiteness, brightness and covering power characterized by having a high percentage of combined lead oxide and substantially free from uncombined lead oxide.

4. As a new article of manufacture, a fumed basic lead sulphate pigment of a high degree of whiteness, brightness and covering power characterized by having a combined lead oxide component of twenty per cent or more and substantially free from uncombined lead oxide.

5. As a new article of manufacture a fumed basic lead sulphate pigment of a high degree of whiteness, brightness and covering power characterized by having a combined lead oxide component of twenty per cent or more and substantially free from uncombined lead oxide and from zinc oxide.

6. As a new article of manufacture, a fumed basic lead sulphate pigment of a high degree of whiteness, brightness and covering power characterized by having a combined lead oxide component of about thirty per cent and substantially free from uncombined lead oxide.

7. As a new article of manufacture a fumed basic lead sulphate pigment of a high degree of whiteness, brightness and covering power characterized by having a combined lead oxide component of about thirty per cent and substantially free from uncombined lead oxide and from zinc oxide.

JOHN A. SCHAEFFER.
JOHN H. CALBECK.
BERNARD S. WHITE.